United States Patent
Dai et al.

(10) Patent No.: US 10,095,061 B2
(45) Date of Patent: Oct. 9, 2018

(54) FRAMELESS DISPLAY DEVICE

(71) Applicant: ScienBiziP Consulting (Shenzhen) Co., Ltd., Shenzhen (CN)

(72) Inventors: Feng-Yuen Dai, New Taipei (TW); Chau-Jin Hu, New Taipei (TW); Po-Chou Chen, New Taipei (TW)

(73) Assignee: ScienBiziP Consulting(Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 14/984,945

(22) Filed: Dec. 30, 2015

(65) Prior Publication Data
US 2017/0146840 A1    May 25, 2017

(30) Foreign Application Priority Data

Nov. 25, 2015 (TW) .............................. 104139277 A

(51) Int. Cl.
| | |
|---|---|
| *G09F 13/04* | (2006.01) |
| *G09F 13/08* | (2006.01) |
| *G02F 1/1333* | (2006.01) |
| *G02F 1/1335* | (2006.01) |
| *F21V 8/00* | (2006.01) |

(52) U.S. Cl.
CPC ....... *G02F 1/13336* (2013.01); *G02B 6/0036* (2013.01); *G02B 6/0055* (2013.01); *G02F 1/133603* (2013.01); *G02F 1/133606* (2013.01); *G02F 1/133611* (2013.01); *G02F 2001/133607* (2013.01)

(58) Field of Classification Search
CPC ........... G02F 1/13336; G02F 1/133606; G02F 2001/133607; G02F 1/133611; G02B 6/0036; G02B 6/0055

USPC ......................................................... 362/97.1
See application file for complete search history.

(56) References Cited

U.S. PATENT DOCUMENTS

| | | | | |
|---|---|---|---|---|
| 5,661,531 A | * | 8/1997 | Greene | ............. G02F 1/133512 |
| | | | | 349/73 |
| 2016/0062163 A1 | * | 3/2016 | Lee | ......................... G02B 17/00 |
| | | | | 359/599 |

FOREIGN PATENT DOCUMENTS

| | | |
|---|---|---|
| CN | 202253209 U | 5/2012 |
| TW | 201319686 A1 | 5/2013 |
| TW | 201415135 A | 4/2014 |
| TW | 201432351 A | 8/2014 |

* cited by examiner

*Primary Examiner* — Elmito Breval
*Assistant Examiner* — Jessica M Apenteng
(74) *Attorney, Agent, or Firm* — ScienBiziP, P.C.

(57) ABSTRACT

A frameless display device includes a plurality of display units. Each of the display units includes a display panel including a display surface and a non-display surface opposite to the display surface, a frame formed on the edge of the display panel surrounding the display panel, a backlight module corresponding to the non-display surface including at least one backlight, an image elongated element corresponding to the display surface. Each of the display units further includes a light compensating module. The light compensating module is adjacent to the frame and includes at least one light panel and at least one compensating light. The light compensating module further includes a gap. The gap is defined in the light panel corresponding to the backlight.

12 Claims, 6 Drawing Sheets

FRAMELESS DISPLAY DEVICE

FIELD

The subject matter herein generally relates to a display device, particularly to a frameless display device that includes a number of display units spliced together.

BACKGROUND

Large size display devices are widely used. A number of display units are spliced together to comprise a large size display device. Every display unit has a frame which can divide the image of the display units and affect the continuity of the image.

BRIEF DESCRIPTION OF THE DRAWINGS

Implementations of the present technology will now be described, by way of example only, with reference to the attached figures.

DETAILED DESCRIPTION

Figure 1:
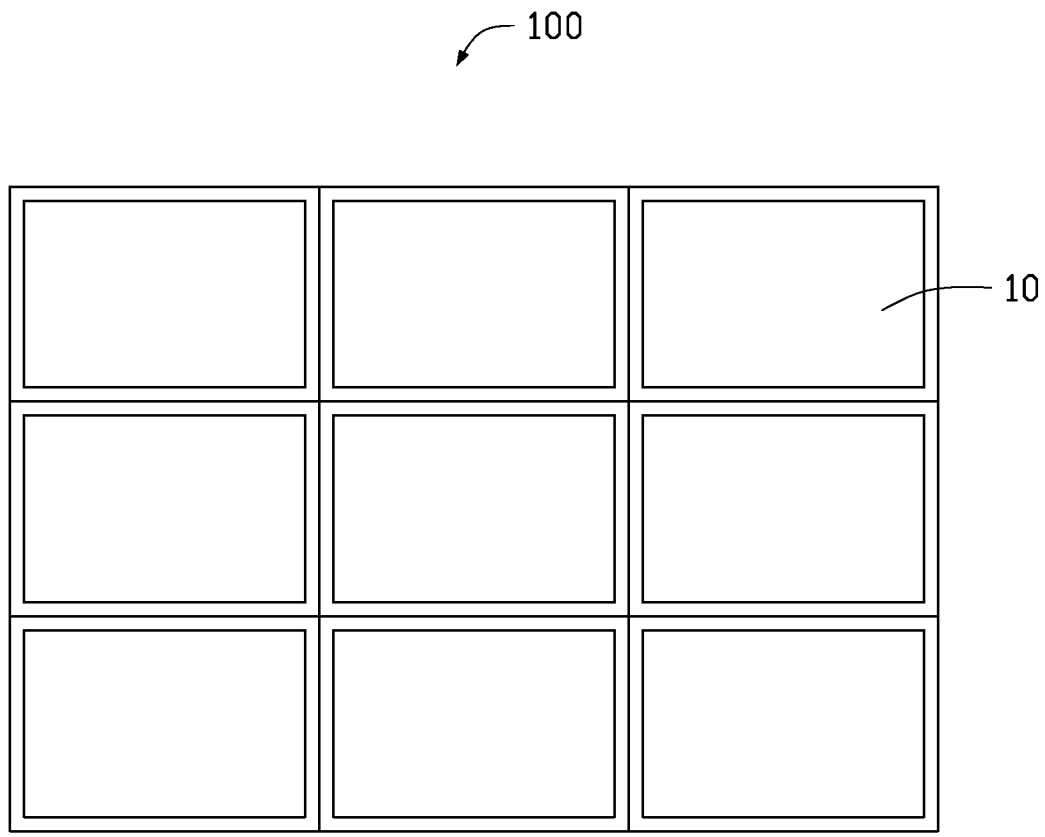
FIG. 1 is a plan view of a frameless display device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

A plurality of definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

The present disclosure is described in relation to a frameless display device.

FIG. 1 illustrates a frameless display device 100. The frameless display device 100 includes a plurality of display units 10. The a plurality of display units 10 make up an array with no gap between the a plurality of display units 10. In the illustrated embodiment, the frameless display device 100 includes nine display units 10 positioned in a 3×3 array. In the illustrated embodiment, the amount of the display units 10 is not limited to nine.

In the illustrated embodiment, the display unit 10 is a liquid crystal display unit. In at least one embodiment, the display unit 10 can be a plasma display unit.

Figure 2:
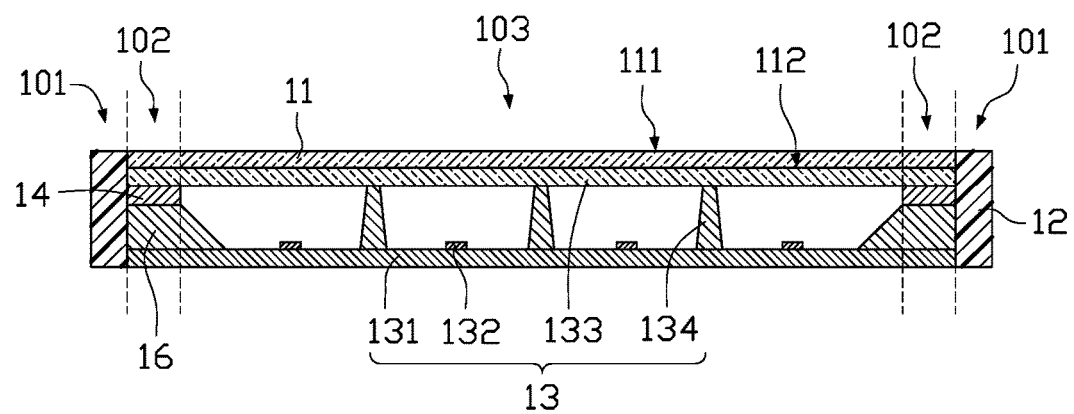
FIG. 2 is a partial cross sectional view of FIG. 1.

FIG. 2 illustrates that the display unit 10 includes three districts: a frame district 101, an image elongation district 102 and an image observation district 103. The frame district 101 surrounds the image elongated district 102. The image elongation district 102 surrounds the image observation district 103.

The display unit 10 includes a display panel 11, a frame 12, a backlight module 13, a light compensation module 14 and a number of second supports 16.

The display panel 11 includes a display surface 111 and a non-display surface 112 opposite to the display surface 111. The display surface 111 is used to display images.

The frame 12 is installed on the edge of the display panel 11 and surrounds the display surface 111. The frame 12 corresponds to the frame district 101 and used to fix the display panel 11. The frame 12 can be made of lightproof resin material. Generally, the color of the frame 12 is black.

The backlight module 13 includes a printed circuit board 131, a number of backlights 132, a diffusion plate 133 and a plurality of first supports 134. The printed circuit board 131 is fixed on the frame 12 corresponding to the display panel 11. The display panel 11, the frame 12 and the printed circuit board 131 collectively define a space. The backlights 132, the diffusion plate 133 and the first supports 134 are all fixed on the space L.

The backlights 132 are fixed on the fitting surface of the printed circuit board 131 equably and electrically connected to the printed circuit board 131. The backlights 132 are corresponding to the image observation district 103. The backlights 132 can be light emitting diodes, laser diodes and so on.

The diffusion plate 133 is fitted closely with the non-display surface 112 and aligned with the backlights 132. The diffusion plate 133 is used to diffuse and transmit the light of the backlights 132.

The first supports 134 are set on the fitting surface of the print circuit board 131 equably and used to fix the diffusion plate 133. In the illustrated embodiment, the first supports 134 are substantially echelon-shaped. In the at least one embodiment, the first supports 134 can be other shapes.

The light compensation module 14 is corresponding to the image elongated district 102 and opposite to the display panel 11. The light compensation module 14 is set in the space L and used to compensate light so as to ensure the appearance of the darkness in the image elongated district 102, and then improve the quality of the image.

Figure 3:
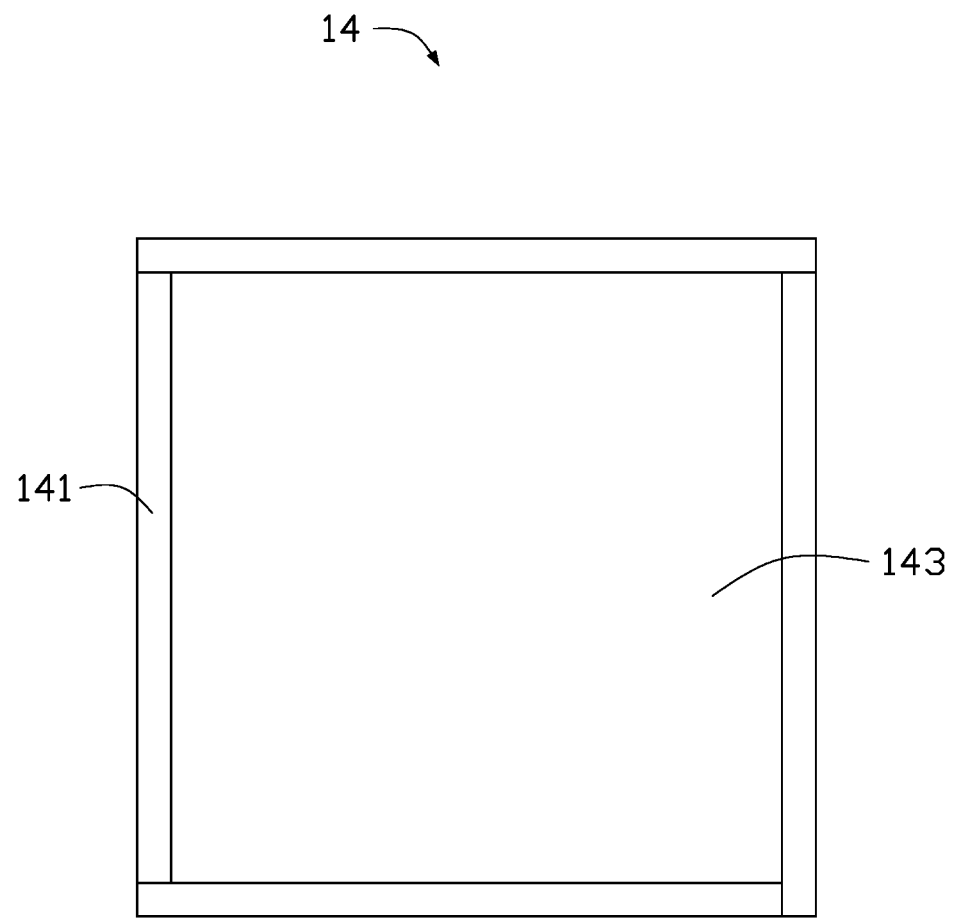
FIG. 3 is a plan view of a light compensation module of the display unit in FIG. 2.
Figure 4:
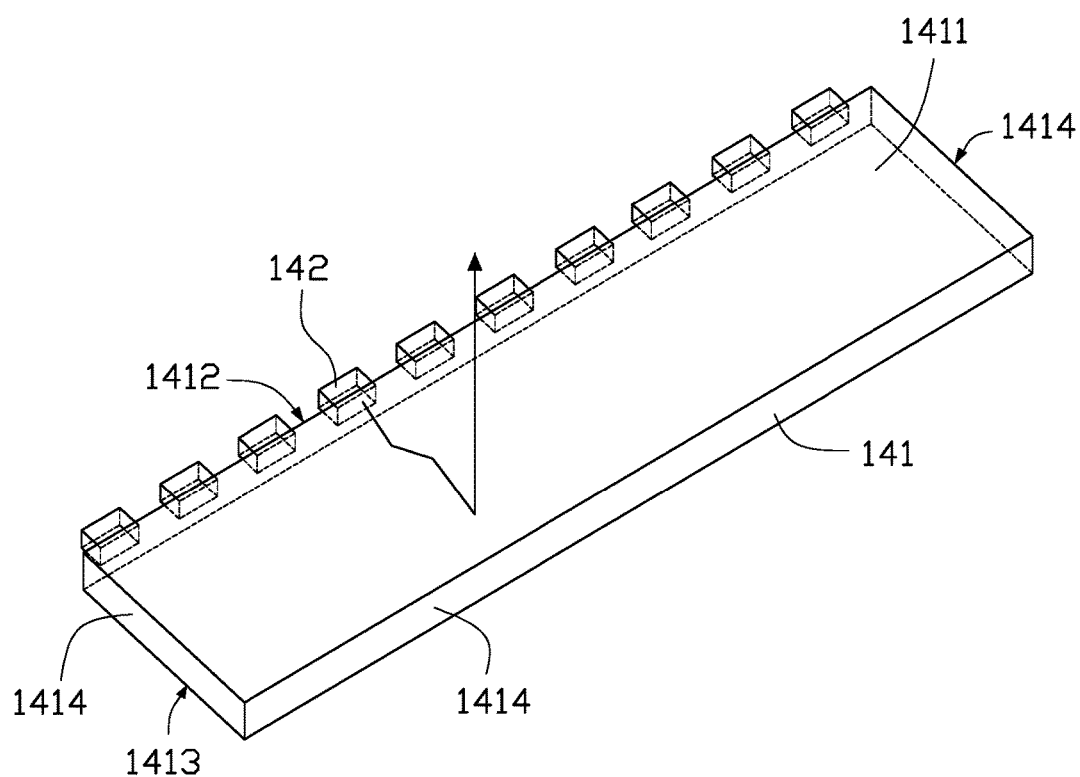
FIG. 4 is a plan view of a light panel of the display unit in FIG. 3.
Figure 5:
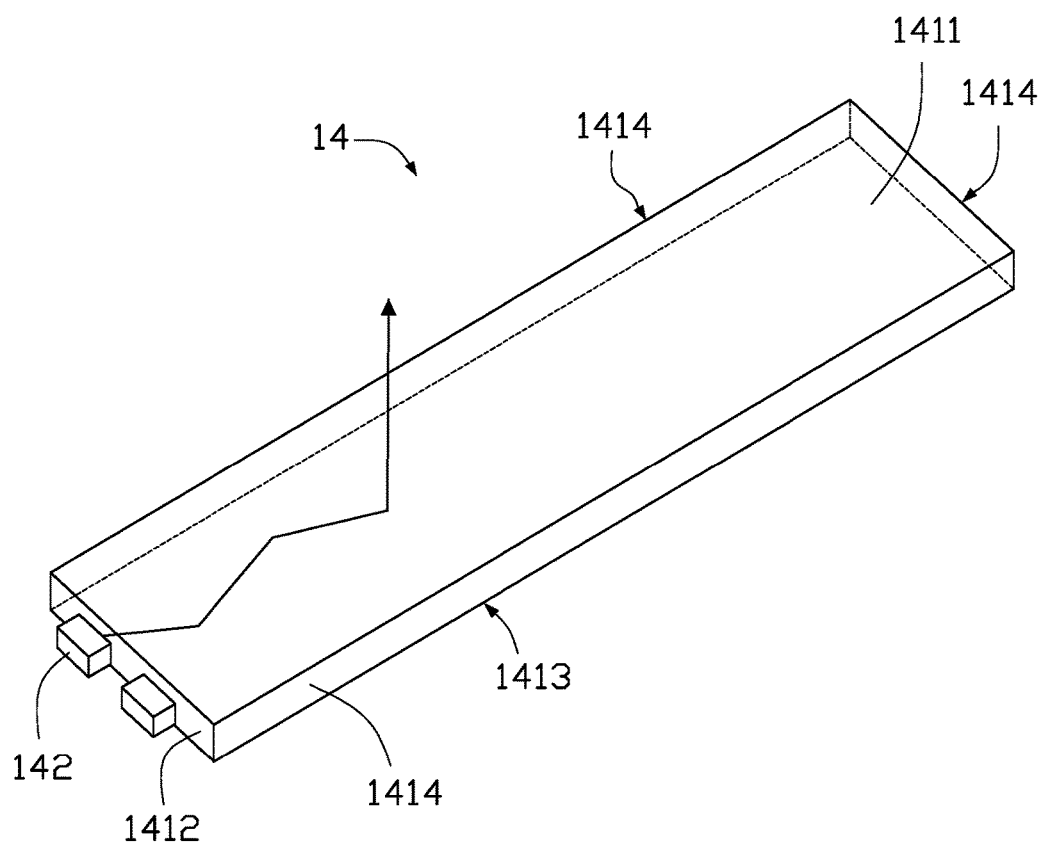
FIG. 5 is a plan view of another light panel of the display unit in FIG. 3.

FIGS. 3-5 illustrate that the light compensation module 14 includes at least one light panel 141 and at least one compensating light 142. The light panel 141 is opposite to the image elongated district 102. The light compensation module 14 also includes a gap 143. The gap 143 is formed in the light panel 141 corresponding to the backlights 132. The light from the backlight 132 can pass through the gap 143 and run into the display panel 11. The light from the compensating light 142 transmits into the light panel 141 and then transmits into the display panel 11 which is adjacent to the frame 12, so as to compensate for the light loss caused by elongating the image. The gap 143 is substantially a hollow-square-shaped and can be formed by a single light panel 141 or a plurality of light panels 141. In the illustrated embodiment, the gap 143 is defined by four oblong-shaped light panels 141.

The light panel 141 includes a light emitting surface 1411, a light incident surface 1412, a bottom surface 143 opposite to the light emitting surface 1411 and three side surfaces 1414 perpendicular to the light incident surface 1412. The light emitting surface 1411 is opposite to the display surface 111 and touches the diffusion plate 133. The compensating light 142 is distributed on the light incident surface 1412 equably and electrically connected to the printed circuit board 131.

Figure 6:
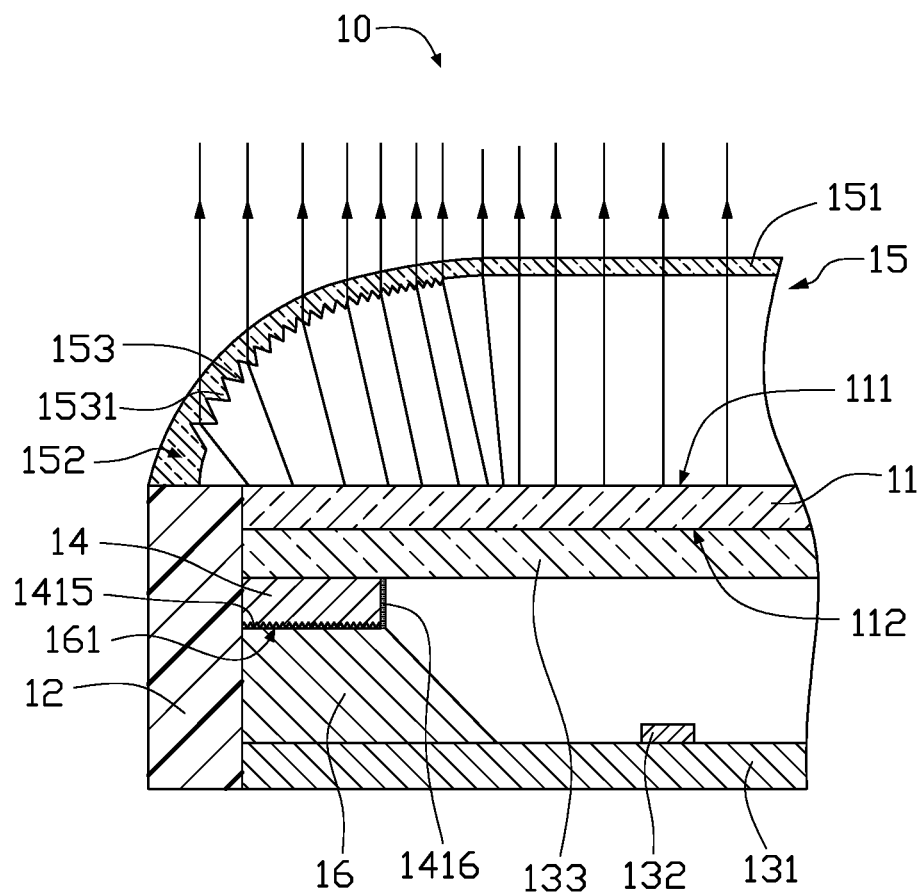
FIG. 6 is a plan view of light of the display unit in FIG. 2.

FIG. 6 illustrates that a plurality of micro structures 1415 are formed on the bottom surface 1413. The micro structures 1415 can change the direction of the light from the compensating light 142 and run out perpendicularly from the light incident surface 1412. Two of the side surfaces 1414 are intersected with the light emitting surface 1411 and another is opposite to the light incident surface 1412. Three reflecting coatings 1416 are formed on the side surfaces 1414. The reflecting coatings 1416 can improve the reflectivity of the side surfaces 1414 and avoid light leakage.

The compensating light 142 can be light emitting diode, laser diode and so on.

FIG. 6 illustrates that the display unit 10 also includes an image elongation element 15. In the illustrated embodiment, the image elongation element 15 is a cover. The image elongation element 15 is used to protect the display units 10 from dust or moisture pollution or damage from outside forces. The image elongation element 15 includes a tabulate midsection 151 and a flexion 152 surrounding the midsection 151. The midsection 151 and the flexion 152 are all transparent.

The image elongated element 15 also includes an optical amplifier structure 153. The optical amplifier structure 153 is formed on the inner surface of the flexion 152 and corresponding to the frame district 101 and the image elongated district 102. The optical amplifier structure 153 is used to elongate the image adjacent to the frame 12 and guides the image upper of the frame 12. As a result, the frame 12 becomes invisible or inconspicuous at least at an expectable visual angle. The optical amplifier structure 153 includes a lot of micro optical lenses 1531.

The second supports 16 are fixed on the fitting surface of the printed circuit board 131 equably and used to support the light panel 141. In the illustrated embodiment, the second supports 16 are trapezoid-shaped. In the at least one embodiment, the second supports 16 can be other shapes, for example, taper-shaped, cylinder-shaped. The second support 16 includes a support surface 161. The light panel 141 is set on the support surface 161.

It will be understood that the above particular embodiments are shown and described by way of illustration only. The principles and the features of the present disclosure can be employed in various and numerous embodiments thereof without departing from the scope of the disclosure. The above-described embodiments illustrate the scope of the disclosure but do not restrict the scope of the disclosure.

What is claimed is:

1. A frameless display device comprising:
a plurality of display units collectively defining an array abutting one another between the a plurality of display units, each of the plurality display units comprising:
a display panel comprising a display surface and a non-display surface opposite to and facing the display surface;
a frame being formed on the edge of the display panel and surrounding the display panel;
a backlight module facing the non-display surface and comprising at least one backlight; and
an image elongation element corresponding to the display surface;
a light compensating module adjacent to the frame and comprising at least one light panel and at least one compensating light distributed on the at least one light panel, wherein the at least one compensating light emits light into a portion of the at least one light panel which transmits into the display panel adjacent to the frame, wherein the light panel is hollow rectangular and forms a gap in a center of the light panel, the at least one backlight faces the non-display surface of the display panel and emits light to the non-display surface through the gap.

2. The frameless display device of claim 1, wherein the light panel comprises a light emitting surface, a light incident surface, a bottom surface opposite to the light emitting surface and three side surfaces perpendicular to the light incident surface, the backlight module further comprises a diffusion plate fitted closely with the non-display surface and aligned with the at least one backlight, the light emitting surface is opposite to the display surface and touches the diffusion plate, the at least one compensating light is distributed on the light incident surface equably.

3. The frameless display device of claim 2, wherein a plurality of micro structures are formed on the bottom surface, two of the side surfaces are intersected with the light emitting surface, and another of the side surfaces is opposite to the light incident surface, three reflecting coatings are formed on the side surfaces.

4. The frameless display device of claim 2, wherein the backlight module further comprises a printed circuit board and a plurality of first supports, the printed circuit board is fixed on the frame and corresponding to the display panel, the at least one backlight is fixed on a fitting surface of the printed circuit board equably and electrically connected to the printed circuit board, the plurality of first supports are set on the fitting surface of the printed circuit board equably to fix the diffusion plate.

5. The frameless display device of claim 4, wherein the display panel, the frame, and the printed circuit board collectively defines a space, the at least one backlight, the diffusion plate and the plurality of first supports are fixed on the space.

6. The frameless display device of claim 4, further comprising a plurality of second supports, wherein the plurality of second supports is fixed on the fitting surface of the printed circuit board equably, each of the plurality of second support comprises a support surface, the light panel is set on the support surface.

7. The frameless display device of claim 4, wherein the at least one compensating light is electrically connected to the printed circuit board.

8. The frameless display device of claim 7, wherein the image elongation element is a cover which completely covers the display surface.

9. The frameless display device of claim 1, wherein the image elongation element comprises a tabulate midsection and a flexion surrounding the midsection, the midsection and the flexion being pellucid.

10. The frameless display device of claim 9, wherein the image elongation element further comprises an optical amplifier structure, the optical amplifier structure is formed on an inner surface of the flexion and adjacent to the frame.

11. The frameless display device of claim 10, wherein the optical amplifier structure comprises a plurality of micro optical lenses.

12. The frameless display device of claim 1, wherein the gap is substantially a hollow-square-shaped and formed by a single light panel or a plurality of light panels.

* * * * *